Feb. 23, 1965

C. A. WILEY 3,171,126

PASSIVE DETECTION AND RANGING SYSTEM

Filed April 14, 1961

INVENTOR.
CARL A. WILEY

INVENTOR.
CARL A. WILEY

INVENTOR.
CARL A. WILEY

Feb. 23, 1965     C. A. WILEY     3,171,126

PASSIVE DETECTION AND RANGING SYSTEM

Filed April 14, 1961     5 Sheets-Sheet 5

| CASE | FREQUENCY | $\Delta\theta_1 = \Delta\theta_2$ | SOURCE | $\Delta\theta_3$ | $T_3$ | $\frac{\Delta\theta_3}{\Delta\theta_2}$ | $\frac{L}{\Delta\theta_1} = \frac{10^2}{\Delta\theta_2}$ | SHIP $10^4 ft^2 = \sigma$ | | AIRPLANE $\sigma = 600 ft^2$ .4 SEC TIME CONSTANT r NAUT. MI. |
|---|---|---|---|---|---|---|---|---|---|---|
| | | | | | | | | r ft. | r NAUT. MILES | |
| 1. | X-BAND | 0.5° | SUN | 0.5° | 25,000°K | 1 | 12,000 | $1.5 \times 10^9$ | $2.5 \times 10^5$ | 31,250 |
| 2. | X-BAND | 0.5° | MOON | 0.5° | 250° | 1 | 12,000 | $1.5 \times 10^7$ | $2.5 \times 10^3$ | 312 |
| 3. | 1420 MC. | 2.85° | SUN | 0.5° | 300,000° | .175 | 2,000 | $5 \times 10^8$ | $8 \times 10^4$ | 10,000 |
| 4. | 1420 MC. | 2.85° | MILKY WAY | ∞ | 100° | 1 | 2,000 | $10^6$ | 167 | 21 |
| 5. | 1420 MC. | 2.85° | MOON | 0.5° | 250° | .175 | 2,000 | $10^5$ | 16.7 | 2 |
| 6. | 300 MC. | ANT.1-5.7° x 28.6° ANT.2-5.7° x 5.7° | COSMIC NOISE GALACTIC POLE | ∞ | 100° | 1 | 450 | $2.25 \times 10^5$ | 37 | 5 |
| 7. | 300 MC. | ANT.1-5.7° x 28.6° ANT.2-5.7° x 5.7° | COSMIC NOISE GALACTIC PLANE | ∞ | 560° | 1 | 450 | $1.26 \times 10^6$ | 210 | 24 |
| 8. | 300 MC. | ANT.1-5.7° x 28.6° ANT.2-5.7° x 5.7° | CASSIOPEIA NEBULA 19H 57M 4G.5 RA 40° 30' 7" DEC | 4' | 200° | 1 | 450 | $4.5 \times 10^5$ | 75 | 9 |
| 9. | 300 MC. | ANT.1-5.7° x 28.6° ANT.2-5.7° x 5.7° | SUN | 0.5° | 1,000,000° | .087 | 450 | $2 \times 10^8$ | $3.3 \times 10^4$ | 4,125 |
| 10. | 1420 MC. | ANT.1-2.85° ANT.2-10 M x 10 M ARRAY | CASSIOPEIA NEBULA | 4' | 107° | 1 | 2,000 | $1.1 \times 10^6$ | 178 | 22 |
| 11. | 1420 MC | ANT.1-2.85° ANT.2-10 x 10 M | CYGNUS A or TAURUS - NIL | 1' | 64° | 1 | 2,000 | $6.4 \times 10^5$ | 107 | 13 |

Fig. 5

INVENTOR.
CARL A. WILEY
BY Fulwider Mattingly & Huntley
Attorneys

United States Patent Office 3,171,126
Patented Feb. 23, 1965

3,171,126
PASSIVE DETECTION AND RANGING SYSTEM
Carl A. Wiley, Phoenix, Ariz., assignor to Giannini
Scientific Corp., a corporation of Delaware
Filed Apr. 14, 1961, Ser. No. 103,019
16 Claims. (Cl. 343—112)

My invention relates generally to radio detection and ranging systems, and more particularly to a novel passive, all weather target detection and ranging system.

In radar systems, radio pulses or waves are sent out by a transmitter and strike a target which reflects a small but measurable amount of radio energy back to the receiver of the radar system. The reflected radio energy or echo is detected by the receiver and utilized to form a picture or other visual representation of the target. It is possible, of course, for others to detect the transmitted radio pulses or waves and determine the position of the transmitter by suitable equipment. This is not desirable during certain times, as during wartime. Further, when the transmitted radio pulses or waves are detected, jamming operations could be initiated so that it is no longer possible to detect and/or track a target.

It is a major object of my invention to provide a passive detection and ranging system which does not actively transmit detectable radio pulses or waves.

Another object of this invention is to provide a passive detection and ranging system which is effective and useful at all times and during all weather conditions.

A further object of my invention is to provide a passive detection and ranging system which can accurately derive continuous range and velocity data of a moving target.

A still further object of this invention is to provide means in a passive detection and ranging system for producing a direct and visible indication of a target and its range and velocity.

Another object of the invention is to provide a passive detection and ranging system wherein noise radiation from a celestial source can be effectively utilized by the system for detection of a target.

Still another object of my invention is to provide a passive detection and ranging system wherein terrestrial or extra-terrestrial artificial sources of radiation can be used in the system for illuminating a target to be observed.

My invention possesses other objects and features, some of which, together with the foregoing, will be set forth in the following description of a preferred embodiment of the invention. The invention will be more fully understood by reading the description with joint reference to the attached drawings, in which:

FIGURE 5 is a table of computed ranges of targets of various sizes detectable by the use of the invention; and FIGURE 6 is a graph illustrating performance of the present system in comparison with existing radar systems.

Figure 1:
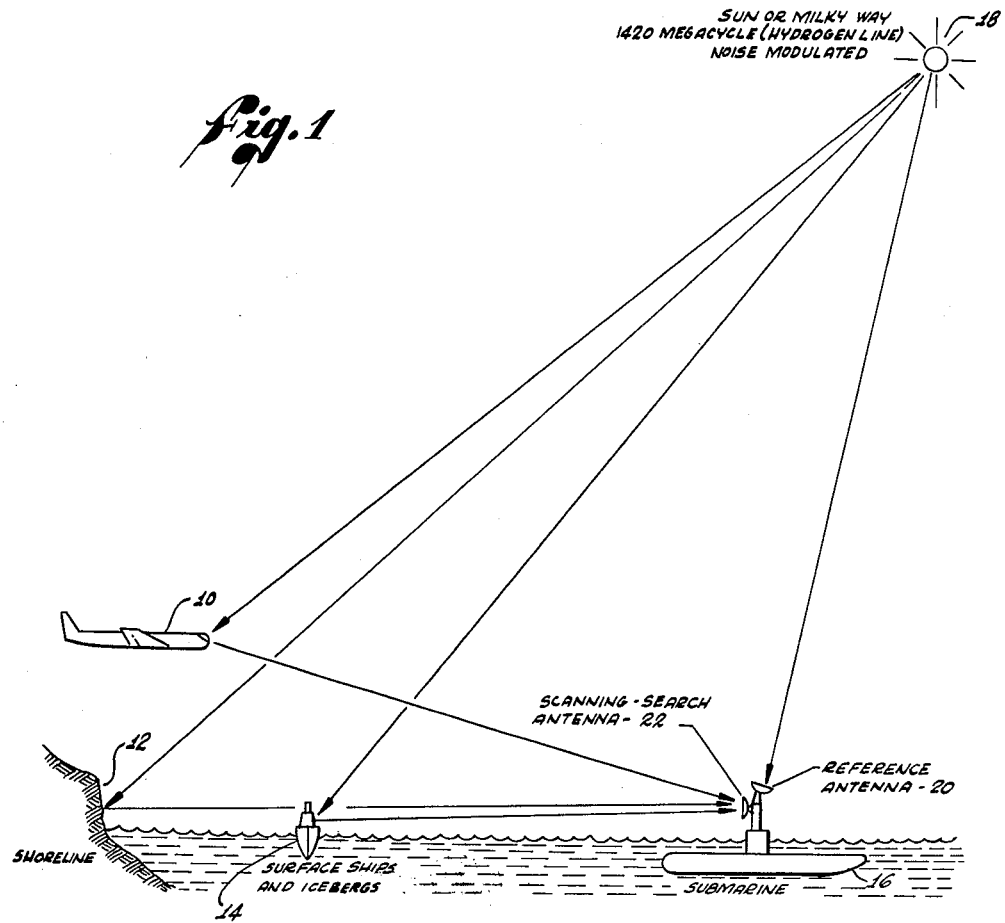
FIGURE 1 is a drawing, somewhat diagrammatically presented, illustrating various uses of my invention in detecting different targets.

Various uses of my invention in locating and detecting target items such as aircraft 10, shoreline 12 and surface ships 14 (or icebergs) from a submarine 16, for example, are indicated in the illustration of FIGURE 1. Radiation from a celestial source 18 strikes the different targets and also a reference antenna 20 mounted on the submarine 16. This radiation is reflected from the targets and can be picked up by a scanning search antenna 22 which is also mounted on the submarine 16, close to the reference antenna 20. The celestial source 18 can be the sun, moon, galactic plane (Milky Way), or radio point sources such as certain stars, the Cassiopeia Nebula, and the Cygnus–A colliding galaxies. There are, of course, many other sources that can be used, including general sky noise, a satellite placed in a fixed orbit and generating strong hydrogen line noise, the aurora in polar regions, and thermal radiation from high land when close to mountainous coasts, among others. Even jamming noise generated by others to prevent radar detection can make a good source.

Figure 2:
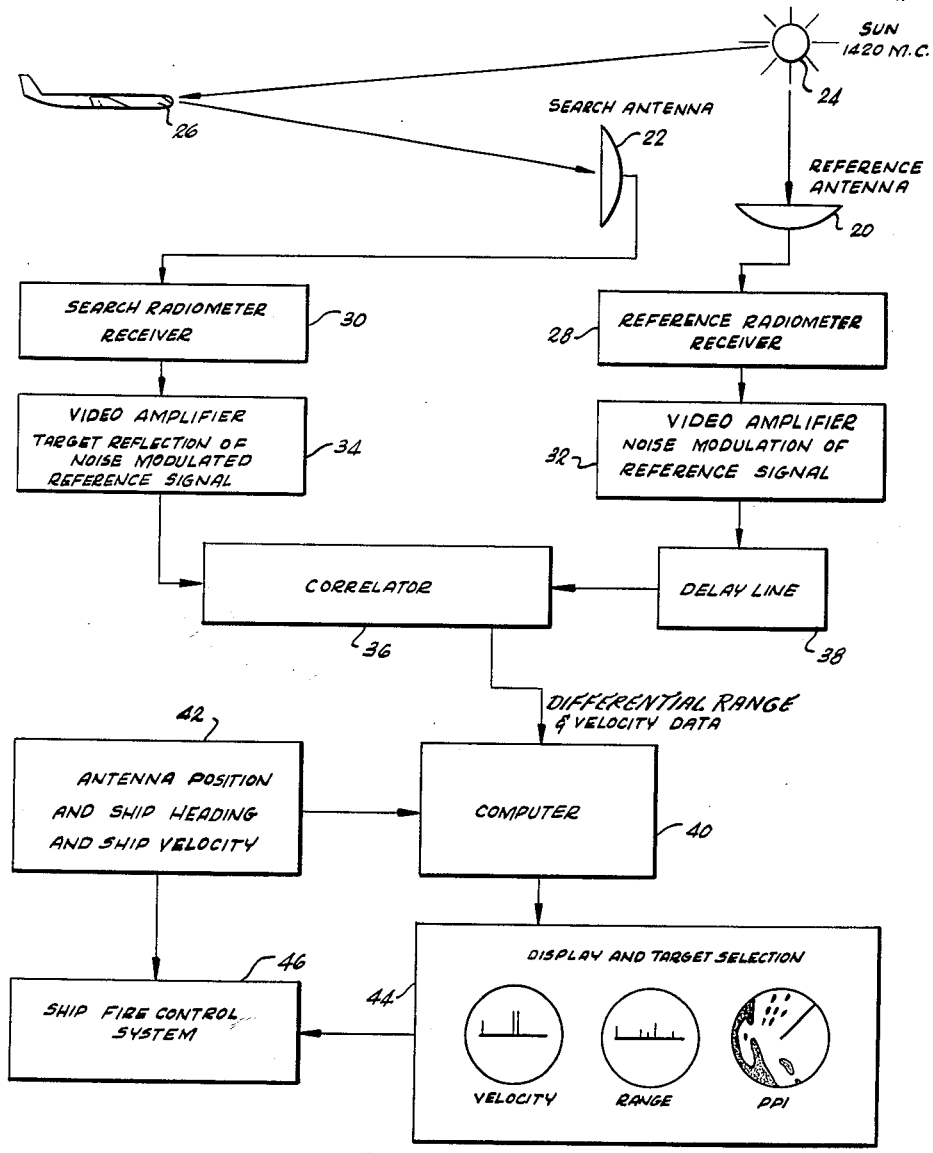
FIGURE 2 is a block diagram of a preferred embodiment of a passive detection and ranging system constructed according to my invention.

A preferred embodiment, in block diagram form, of my novel passive, all weather target detection and ranging system is shown in FIGURE 2. As indicated, the sun 24 provides noise modulated hydrogen line radiation to illuminate target 26. The sun, moon, Milky Way and radio stars are, for example, sources of noise modulated, 1420 mc./s. (hydrogen line) radiation. The reference antenna 20 tracks the sun 24, for example, while the search antenna 22 continuously sweps in azimuth to detect the reflected radiation from any target such as 26. The system thus receives a reference signal from the sun 24 and receives the same signal reflected from the target 26 in time delay proportional to target range.

Each antenna 20 or 22, and its respectively associated receiver 28 or 30, is essentially a radiometer or radio star telescope. The outputs of receivers 28 and 30 are respectively fed to video amplifiers 32 and 34. The amplified output from amplifier 34 is fed to one input of correlator 36 and the amplified output from amplifier 32 is first delayed by delay line 38 and then fed to another input of the correlator 36. The correlator 36 compares the noise modulated reference signal from the sun 24 received by the reference antenna 20 with the noise modulated signal received by the scanning search antenna 22. The correlator 36 recognizes only target signals and cancels out all non-coherent noise. Differential range and target velocity data is provided from the correlator 36, and such data (signals) are fed to a conventional computer 40 for modification by antenna position (both antennas), ship (submarine 16, for example) heading and ship velocity data 42 supplied to the computer 40 to produce true range and velocity data which can be conventionally presented on standard radar target display systems 44. Such computer operates in dependency on the time phase of the target signal and its rate of phase change relative to the recurrent output of the orthicon sweep generator shown in FIGURE 4, as is conventional in pulse radar systems. The antenna position, ship heading and velocity data, in conjunction with the true range and velocity data, can be used to control the ship's fire control system 46 as indicated in FIGURE 2.

Figure 3:
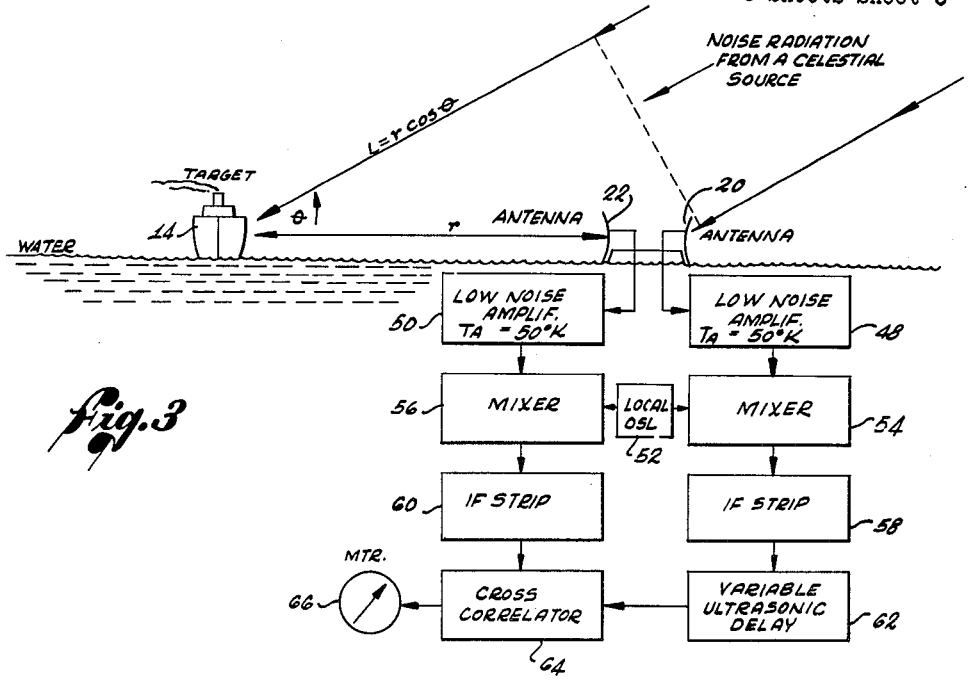
FIGURE 3 is a schematic diagram of the passive detection and ranging system, showing the system in generally conventional components.

A more detailed illustration of my invention is shown in FIGURE 3. The target, in this instance, is depicted as a ship 14. As can be seen in FIGURE 3, radiation from a celestial source such as the sun, moon, galactic plane or radio stars strikes both the target 14 and reference antenna 20 of the system. The target 14 scatters energy back to search antenna 22 as in a conventional radar. Two low level antenna output signals are obtained from antennas 20 and 22, and respectively amplified in very low noise amplifiers 48 and 50 of the type used in microwave radiometers, radio telescopes and probe telemetry. These amplifiers can be masers, diode parametric amplifiers or the fast wave electron beam parametric amplifiers developed by Zenith Radio Corporation.

The amplified signals are then conventionally reduced to a common intermediate frequency by local oscillator 52, and mixers 54 and 56 which mixers respectively accept the output signals of amplifiers 48 and 50. The intermediate frequency signals from mixers 54 and 56 are amplified by IF strip amplifiers 58 and 60, respectively, which correspond to the general video amplifiers 32 and 34 indicated in FIGURE 2. The direct signal from the celestial source as amplified by strip amplifier 58 is delayed by a variable ultrasonic delay line 62, which corresponds to delay line 38 of FIGURE 2. The outputs of strip amplifier 60 and delay line 62 are fed to cross correlator 64. The cross correlator 64 is preferably a conventional electro-optical cross correlator. The output of the cross correlator 64 contains complete information of differential range and velocity of the target.

From FIGURE 3, it can be easily seen that for an essentially infinitely located source, the following relationships are true:

$$r+L=r+r\cos\theta=r(1+\cos\theta)$$

$$r=\frac{r+L}{1+\cos\theta}=\frac{d}{1+\cos\theta}$$

where $d=r+L$.

Now when the internal delay in the sky channel of the cross correlator 64 equals the delay in the target channel, $r+L$, the common celestial noise will cross correlate and produce a large output signal. When the two delays are not equal, correlation does not occur and the output drops to a low level. Noise originating in one channel alone will find no corresponding noise signal in the other channel and will not correlate. Such noise can be caused by thermal emission from objects seen by either antenna, emission from resistive elements in the antennas and feeds to the amplifiers, or in the low noise amplifiers.

Once $r+L=d$ is known by determining the internal variable delay to obtain correlation in the cross correlator 64, and $\theta$ is determined by measuring the elevation of the sky or reference antenna 20, range $r$ is given by the relation $r=d(1+\cos\theta)$. Target bearing is determined by noting the azimuth of the target antenna 22 as with a radar.

Figure 4:
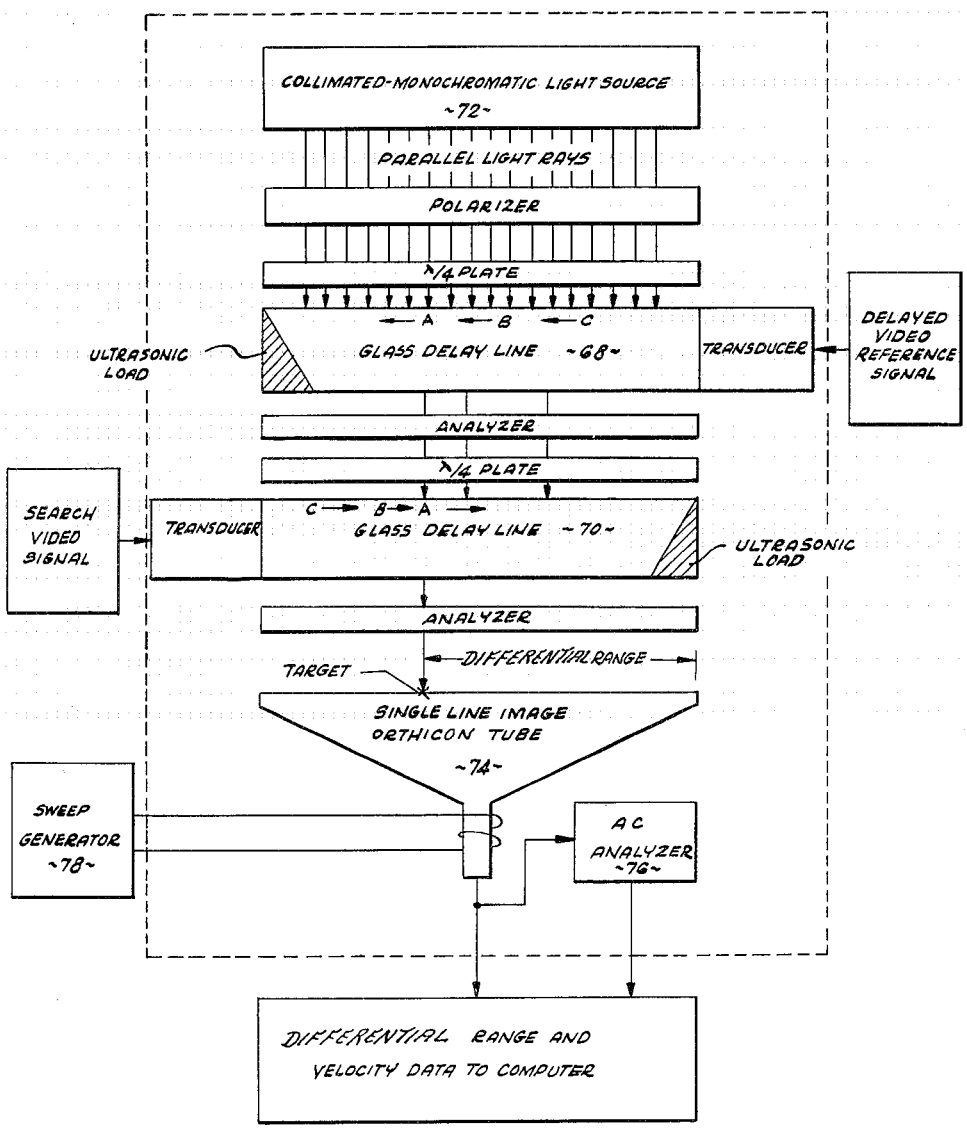
FIGURE 4 is a drawing in block diagram form of a correlator which is preferably used in the system.

The correlator 36 is preferably an electro-optical device which compares the reference signals to the target signals. It consists generally of two glass delay lines 68 and 70, a light source 72, and an output tube 74, as shown in FIGURE 4. The glass delay lines each have a transducer which convert the electrical signal applied thereto into ultrasonic stress (shear) waves that travel down the glass line. A conventional A.C. analyzer or frequency meter 76 for measuring frequency can be also included in the correlator 36 shown in FIGURE 4.

The glass delay lines 68 and 70 become birefringent to polarized light when a shear wave is present. The video reference signal (modulated noise of the 1420 mc./s. source) is continuously fed into one end of the first glass delay line 68. This glass line transmits polarized light at any point where a shear wave corresponding to the video signal is present, such as at points A, B or C. The search video signal is fed into the other glass delay line 70 from the opposite end and transformed into a stress (shear) wave. There is then a continuously varying differential delay between the two signals which varies linearly with position along the length of the lines. Only when identical shear waves are passing each other in the same vertical position (point A) will light be transmitted through the second delay line with average level differing from the average level present when no signals are present in the line. As a result, all random noise is reduced to a low level in the device integrating the light which passed through the delay lines, and only reflected target signals which correlate with the reference signal are transmitted to the pickup tube 74 whose screen acts as an integrator in the correlation process. The target signal appears as an image differing in light level from the quiescent level, referred to as a bright spot, if there is no relative motion between the target and the ranging ship. The differential range is proportional to the distance from the right, zero reference point end of the tube 74 to the position of the bright spot. The output period of sweep generator 78 can be also used by a conventional range gate which can be used with tube 74 and controlled by the picked up target signal (bright spot) to produce a suitable signal electrically representing differential target range. The computer 40 (FIGURE 2) essentially modifies this signal by the factor $$\frac{1}{(1+\cos\theta)}$$

to provide a signal representing true target range. The computer will derive the relative velocity of the gated target from its phase variation in respect to the sweep generator signal in a conventional manner.

Additionally, the relative velocity of the gated target signal can be determined as follows. The intensity of the bright spot is modulated at a frequency proportional to closing velocity if the target is moving. The gated signal is applied through a sweep repetition frequency blocking channel to supply a signal having only the modulation frequency characteristic of the gated target velocity. The A.C. analyzer 76 measures this frequency and provides an output signal representing differential velocity of the target. Thus, both range and velocity information from the target is furnished by the correlator 36, and provided to the computer 40 (FIGURE 2). Correction by the computer 40, mainly of ship bearing and velocity on the differential velocity signal, yields a signal representing true target velocity.

The delay line 38 in FIGURE 2 corresponds to the variable ultrasonic delay line 62 shown in FIGURE 3. Such delay lines are provided to make use of the full lengths of the glass delay lines 68 and 70 for indicating range. For example, if the reference signal was not delayed, and the search signal started at the same time as the reference signal, point A of the signal in each line 68 and 70 would travel from their respective transducer ends down each line at the same velocity and pass at the midpoints of the lines. Correlation occurs and a bright spot is produced at a point corresponding to the middle (laterally) of tube 74. This point then represents zero range since both search and reference signals were considered started at the same instant in the glass delay lines 68 and 70. In order to utilize the right half of tube 74, the reference signal is simply delayed by delay line 62 (FIGURE 3) so that the zero range point is moved to the right end of the tube 74. The delay line 62 provides a time delay, then, of one-half a glass delay line length.

The cross correlator 64 can be a conventional device similar to that described in articles by H. A. Brouneus and W. H. Jenkins in the January 13, 1961 issue of Electronics, entitled "Continuously-Variable Glass Delay Line," and by R. W. Wilmotte in the Final Report, September, 1947, RADC Contract No. AF30(602)–1494, ASTIA No. AD 215485, entitled "Instantaneous Cross-Correlator." It is noted that the tube 74 is preferably a single line image orthicon; however, a vidicon, an array of small photocells with RC integrators in their outputs for line readout or film on which light is projected thereon for a recorded image can be utilized instead.

The passive detection and ranging system described is a coherent system in which the reference is not a sine wave as in radars but that the noise signal coming from the celestial source is considered the reference. Synchronous demodulation followed by Doppler filtering, which is an integration process, is merely a special case of cross correlation. There are also many types of radiation sources that can be used, each with its own advantages and disadvantages. Choice of source type results in different systems operating at very different wavelengths. Since the systems are similar to microwave radiometers, considerations in radiometric temperatures are easier to deal in than in power levels. Of course, conversion to power levels can be made at any point in the system by use of the relationship $P=kTB$, where P is the power level, T the radiometric temperature, B the bandwidth of the system at the point in question, and K is Boltzmann's constant. In c.g.s. units $$k=1.38\times10^{-23}$$

watts/deg./cycle per second.

Depending upon the operating frequency of the system, various different systems are obtained. When a fairly high microwave frequency, like X-band, is used, a system having high antenna directivities needed to obtain good ranges is easily produced. From data of radiometric temperatures of different sources, however, the only sources that can be used are indicated to be the sun or the moon which must be tracked by the sky or reference antenna. At 1420 mc./s., however, there are usefully available at this frequency the sun, the moon, the hydrogen line and radio stars. Data also indicates radiometric temperatures of about 100° K. within ±10° of the galactic plane (Milky Way region) at this frequency. The general sky noise, however, is still very low. In addition, there are several point sources which are useful. All these sources have angular sizes in the order of one to four minutes of arc.

The 1420 mc./s. system is less likely than the X-band system to be out of operation due to lack of a source. For the X-band system fails when neither the sun nor the moon are above the horizon, while the L-band (1420 mc./s.) system fails only if none of the Milky Way and no radio stars are visible during the dark of the moon. Neither system is harmed by the presence of poor weather or clouds.

Finally, considering a system operating near 300 mc./s., it was found that general sky noise is sufficient for operation of the system. However, at 300 mc./s. frequency, the antennas are necessarily larger than that at X-band or L-band. The X-band antennas are, for example, 15 feet parabolas with a beamwidth of ½ degree. The L-band 1420 mc./s. (21 cm.) antennas can be similar to the one described in the February 17, 1961 issue of Electronics, in an article entitled "High-Gain Modular Array Has Low Side Lobes."

At 300 mc./s., in a preferred antenna arrangement, the reference antenna is 10 meters on a side and flush mounted in the deck. It is phased so that the beam looks anywhere from near vertical to nearly end-fire in a direction away from the target. The target antenna is 10 meters wide, but only 2 meters high. As a result, a fan beam is produced. The reference antenna can be directed toward a point source independently of the motion of the target antenna or then can be scanned in azimuth together when using general sky noise. Control of the antennas is effected conventionally and similarly to radar system antennas.

The table in FIGURE 5 lists the effective computed ranges of the passive detection and ranging system embodying my invention in detecting a ship and an airplane. In the table, $\Delta\theta_1$ is the beamwidth of the target antenna
$\Delta\theta_2$ is the beamwidth of the reference antenna
$\Delta\theta_S$ is the angle subtended by the source $$\left(\frac{\Delta\theta_S}{\Delta\theta_2}=1 \text{ for an area source}\right)$$

$T_S$ is the source temperature
$\sigma$ is the target cross-section
L equals the square root of $\sigma$
r is the range It can be seen from FIGURE 3 and shown that the greatest accuracy of the system is obtained when $\theta=0$ and the source is directly to the rear of the target antenna. The system's ability to range disappears when the source is directly behind the target and $\cos\theta=-1$. Actual performance on a generally qualitative basis is given by the performance comparison chart shown in FIGURE 6. The passive detection and ranging system of the present invention has been identified by the word "Stardar," which has been coined by a contraction of the words "star" and "radar."

FIGURE 6 presents a performance comparison between Stardar and existing radar. Range vs. Target Area data for equal radar and Stardar antenna systems show a marked advantage for Stardar in daytime utilizing the sun as the illumination source. The Stardar system is presently inferior to radar systems at night, but still gives adequately useful performance and range for targets of bomber aircraft size or larger.

FIGURE 6 also illustrates the improvement in Stardar performance possible by lowering the search rate of the azimuth scanning, target acquisition antenna. It is possible to increase night time Stardar performance to be equal or better than radar when orbiting satellites generating strong hydrogen line noises are placed in fixed orbits to provide a stronger illumination source than the Milky Way.

Transmission of radio frequency energy at 1420 mc./s. is particularly unaffected by fog, rain, atmospheric and thermal noise. Consequently, the Stardar system provides excellent all weather performance. The system is completely passive in nature and has excellent range performance. The system can also be used for collision (iceberg, for example) avoidance, navigation by radio stars, and navigation along coast lines by ships.

It is to be understood that the particular embodiment of my invention described above and shown in the drawings is merely illustrative of and not restrictive on the broad invention, and that various changes in design, structure and arrangement may be made without departing from the spirit and scope of the appended claims.

I claim:

1. A passive detection and ranging system, comprising: reference antenna means for sensing direct radiation produced by an external noise modulated source and generating a reference output signal; search antenna means for sensing reflected radiation from a target illuminated by said external source radiation and generating a target output signal; means for receiving and amplifying said reference output signal; means for receiving and amplifying said target output signal; means for providing a differential time delay between said output signals; and a correlator for correlating said amplified reference and target output signals to produce a coherent noise correlated output signal indicating the differential range between the signals produced by direct and reflected radiation.

2. The system as defined in claim 1 wherein said reference antenna means is adapted to sense said external source of radiation from a celestial source.

3. The system as defined in claim 1 wherein said reference antenna means is adapted to sense said external source of radiation from a terrestrial source.

4. The system as defined in claim 1 wherein said reference antenna means is adapted to sense radiation from an artificial extra terrestrial source.

5. The system as defined in claim 1 including, in addition, means for presenting a visual display of the output of said correlator whereby to visually indicate said target and its differential range and velocity.

6. The system as defined in claim 1 wherein said correlator includes a cross correlator of the electro-optical type.

7. The system as defined in claim 6 wherein said cross correlator includes output means having a narrow, extended integrating light sensitive area, and electron beam means for scanning said extended integrating area to produce an indexed range output signal.

8. The system as defined in claim 7 including, in addition, means for measuring frequency of said range output signal to produce an indexed velocity output signal.

9. A passive detection and ranging system, comprising: reference antenna means for tracking an external source of noise modulated radiation and sensing direct radiation produced by said source, and generating a reference output signal; search antenna means for scanning a predetermined field and sensing reflected radiation from a target illuminated in said field by said noise modulated radiation from said external source, and generating a target output signal; means for receiving and amplifying said reference output signal; means for receiving and amplifying said target output signal; and a correlator for correlating said amplified reference and target output signals to produce a correlated coherent noise output signal indicating the differential range between the signals produced by direct and reflected radiation.

10. The system as defined in claim 9 wherein said reference antenna means is adapted to sense said external source of radiation from a celestial source.

11. The system as defined in claim 9 wherein said reference antenna means is adapted to sense said external source of radiation from a terrestrial source.

12. The system as defined in claim 9 including, in addition, means for delaying said amplified reference output signal a predetermined delay before applying it to said correlator.

13. The system as defined in claim 9 including, in addition, means for presenting a visual display of said target and its range and velocity.

14. The system as defined in claim 9 wherein said correlator includes a cross correlator of the electro-optical type.

15. The system as defined in claim 14 wherein said cross correlator includes output means having a narrow, extended integrating light sensitive area, and electron beam means for scanning said extended integrating area to produce an indexed range output signal.

16. The system as defined in claim 15 including, in addition, means for measuring frequency of said range output signal to produce an indexed velocity output signal.

References Cited by the Examiner
UNITED STATES PATENTS

| | | |
|---|---|---|
| 2,817,081 | 12/57 | Roberts. |
| 2,837,738 | 6/58 | Valkenburgh _____ 343—112 |
| 3,028,600 | 4/62 | Bailey. |

CHESTER L. JUSTUS, *Primary Examiner.*